Figure 1:
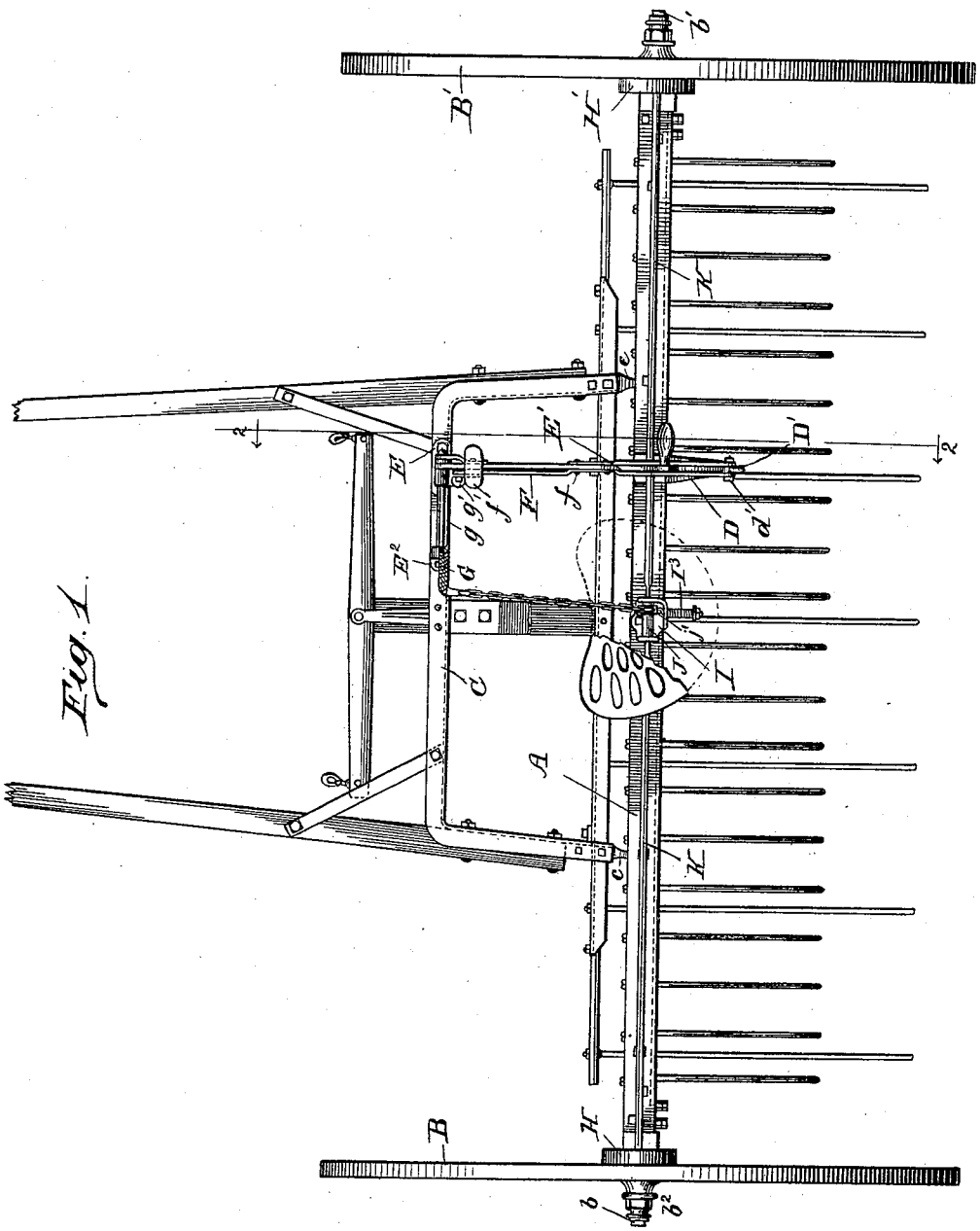

No. 615,722. Patented Dec. 13, 1898.
J. W. LATIMER.
HAY RAKE.
(Application filed Nov. 10, 1897.)
(No Model.) 4 Sheets—Sheet 1.

Witnesses.
Arthur Johnson
Louis O Henssler

Inventor.
John W Latimer

THE NORRIS PETERS CO., PHOTO-LITHO., WASHINGTON, D. C.

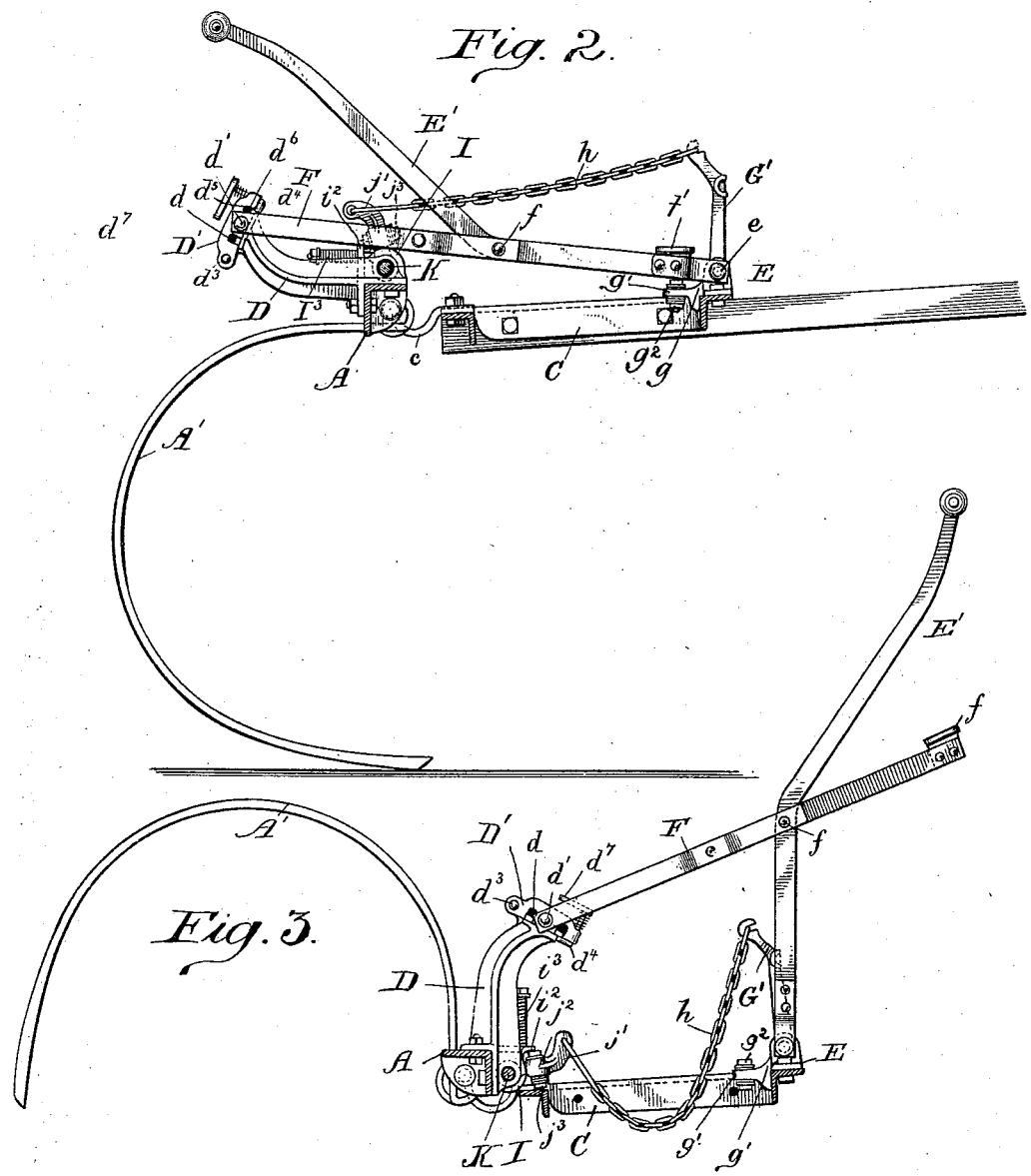

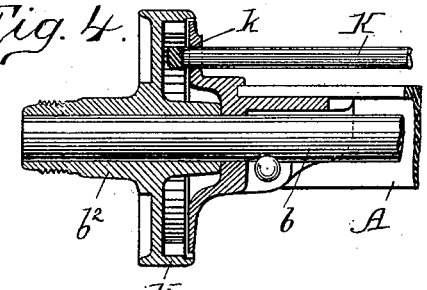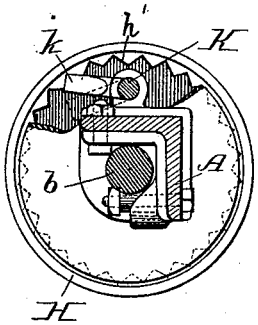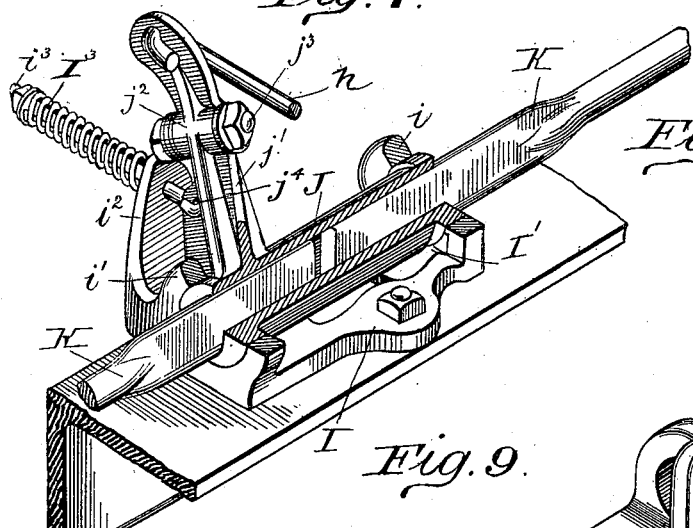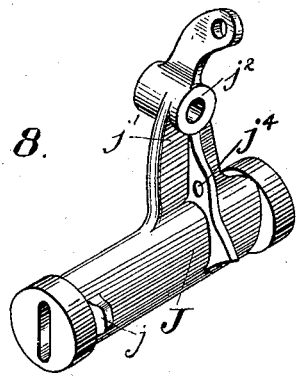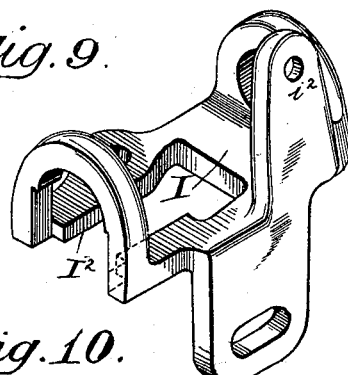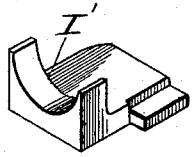

No. 615,722. Patented Dec. 13, 1898.
J. W. LATIMER.
HAY RAKE.
(Application filed Nov. 10, 1897.)
(No Model.) 4 Sheets—Sheet 4.
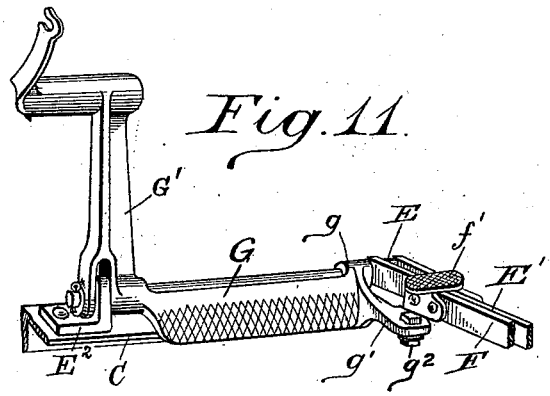
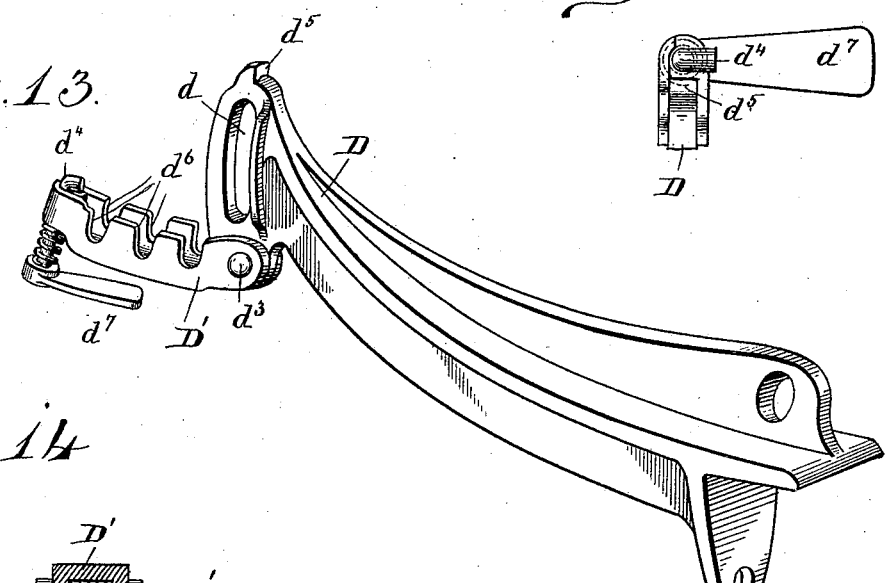
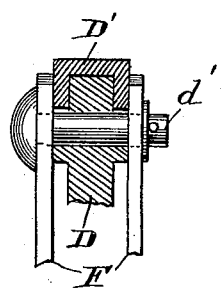
Witnesses
Arthur Johnson
Inventor
John W. Latimer

UNITED STATES PATENT OFFICE.

JOHN W. LATIMER, OF CHICAGO, ILLINOIS, ASSIGNOR TO THE DEERING HARVESTER COMPANY, OF SAME PLACE.

HAY-RAKE.

SPECIFICATION forming part of Letters Patent No. 615,722, dated December 13, 1898.

Application filed November 10, 1897. Serial No. 658,060. (No model.)

*To all whom it may concern:*

Be it known that I, JOHN W. LATIMER, of Chicago, in the county of Cook and State of Illinois, have invented certain new and useful Improvements in Hay-Rakes, of which the following is a full description, reference being had to the accompanying drawings, in which—

Figure 1 is a plan view. Fig. 2 is a sectional view on the line 2 2 of Fig. 1. Fig. 3 is a similar view with the parts shown when the rake is in the dumping position. Figs. 4 and 5 are detailed views of the ratchet-and-pawl mechanism. Fig. 6 is a perspective view of the torsionally-elastic pawl-rod. Figs. 7, 8, 9, and 10 are perspective views of the various parts of the trip-forming mechanism. Fig. 11 is a perspective view of the foot-lever and its associated parts; and Figs. 12, 13, and 14 are detailed views of the arm by which the rake-head is rocked, showing the means for connecting the links forming the toggle-joint that extend from it to the main frame.

The rake-head A is supported upon the carrying-wheels B and B' by means of stub-axles $b$ and $b'$. The hound-frame C is pivotally secured to the rake-head by the hinges $c$ and has the thills or tongue, whichever is used, rigidly secured thereto. The rake-teeth A' may be considered as attached to the rake-head in any known way, and the cleaner, which may be considered as being of any ordinary construction, conveniently secured to the hound-frame. Bolted to the rake-head A is a rearwardly and upwardly extending arm D. A bracket E, secured to the forward member of the hound-frame, affords means for pivoting one member of the toggle-joint connection that controls the rake-head and extended serves as a hand-lever E'. F is a link that forms the second member of the toggle-jointed connection. It is pivoted to the fellow member at $f$ and extending forwardly rests upon the stop-bolt $g^2$ in the arm $g'$, which limits the downward movement of the free end of this member below its line of center. It is provided with a foot-pad $f'$, adapted to serve as means whereby the pressure of the foot of the operator may force it downward to the position shown in Fig. 2. The rear end of this toggle-joint is pivotally connected to the arm D. The length of the toggle-joint connection is constant, and in order that the points of the rake-teeth may be adjusted to a forward or rearward position relative to a vertical line drawn from the axle to the ground a series of holes for the connecting-pin that forms the means for pivotally connecting the said link to the arm D are provided. What, in effect, forms the series of holes, however, is of such a construction that the pivotal pin $d'$ can be changed from one to the other without taking it out of the bar F. The bar F is made of two parallel parts, as shown in Fig. 1, and its rear ends separated sufficiently far to pass each side of the rear end of the arm D and the parts connected to it, as shown in Fig. 14. A slot $d$ is provided in the rear end of the arm D, and a pin $d'$, passing through the bars forming F, also extends through this slot. The movement of the pin upward or downward in this slot varies the position of the points of the rake-teeth to a sufficient extent for reasons that will be apparent when it is considered that the curvature of this slot is not concentric with the pivot-pin $e$ at the forward end of the toggle-jointed connection. In order to hold the pin $d'$ in any desired position in the slot, a hinged block D', provided with notches adapted to clasp the pin $d'$, is provided. This latch is pivoted to the arm at $d^3$ and may be swung upward and the pin $d'$ placed in any of the notches desired. The latch D' is locked in its elevated position by a spring-held hooked bolt $d^4$, that engages a stop $d^5$. To enable the operator to turn the locking-hook $d^4$ from the position of engagement, as shown in Fig. 12, a handle $d^7$ is provided.

In operation as a hand-dump rake simply the lever E', provided with a suitable handle, is raised by the operator, the lock of the toggle-joint broken, and by a continued forward movement of the hand the rake-teeth show the position in Fig. 3. This invention is not, however, limited to a hand-rake, but is adapted when provided with the parts next to be described to be used either as a hand-dump rake or as a horse-dump rake at the will of the operator.

The rake-head is adapted by the following means to be locked to the wheels at intervals in order that the teeth may raise over the load and be set free, and thus permitted to fall and return to position to gather a new load. The supporting-wheels may be of any ordinary construction and provided with ratcheted hubs, preferably of the form shown in Figs. 4 and 5. Within the hub are the ratchet-teeth $h'$ and a pawl $k$, formed upon the torsionally-elastic shaft K, adapted to engage therewith. This pawl is preferably a bend in the shaft, as shown in Fig. 6. Secured to the rake-head adjacent to each wheel is a journal-bearing for the elastic rocking shaft K, which holds the latter and the pawl in proper position relative to the ratchet-wheels. This shaft K is, in effect, continuous from end to end of the rake, but, in fact, made in two parts suitably connected for convenience. It is so proportioned in the matter of size relative to length that the pawls formed upon its ends will yield elastically, so that when rocked to throw them into engagement with the ratchets upon the two wheels one pawl will not be prevented from so dropping as to be engaged by a tooth in the ratchet because the other pawl happens to strike upon the top of one of the ratchet-teeth. The means for controlling the torsionally-elastic coil-supporting bars will be understood by reference to Figs. 6 to 10. Near the middle of the rake these bars are supported in a connecting-piece, forming a journal as well as a connection for them. This journal connecting-piece J is supported in the bracket I. In order that this journal connection may be placed in the bracket I' in assembling the parts, the said bracket is constructed as shown in Figs. 9 and 10. It will be readily seen that the part J may be placed in the proper recesses in the bracket and the block I' placed in the recess $I^2$, and when the bracket is secured to the rake-head, as shown in Fig. 7, the parts are held in proper relation. The connecting-piece J is, in fact, a sleeve provided with a flattened hole extending through it, and into this the flattened ends of the two bars K K are latched. An arm extends upwardly from the cup connecting-piece J, which serves as means for rocking the pawls in the small supporting-shafts K into and out of engagement with the ratchet-teeth in the wheels. In order to keep the ratchet-teeth normally out of engagement, a light spring $I^3$ is provided. This is secured to a spring-rod adjustable in its length, that passes through an upwardly-extending ear $i^2$ and hooks into an eye $j^4$ in the upwardly-extending arm $j'$, as seen in Figs. 7 and 8. Into an eye at the upper end of the arm $j'$ is hooked the tripping-rod seen in Figs. 3 and 7. This rod may be considered as a link in the chain $h$, the pulling of which rocks the shafts K, so as to throw the pawls into engagement with the ratchets at will. The spring $I^3$ has not sufficient tension to rock the pawl-shafts and overcome the frictional contact of the pawls in the ratchets, so that once engaged they remain engaged until forced free therefrom. The means of accomplishing this last result will be best understood by reference to Figs. 3 and 7. The tripping-arm extending from the rocking coupling J is so constructed that when the rake-head has rocked so far forward as to carry the rake-teeth to the desired height it shall strike the hound-frame, as shown in Fig. 3, and in consequence, rocked over rearwardly, force the pawls out of engagement. I provide such an adjustment as will make the height at which the points of the teeth are set free regulable. In the upwardly-projecting arm is a sleeve $j^2$, and through it passes an ordinary machine-bolt $j^3$, provided with a nut. Under this nut is a washer, or there may be several washers. If it is desired to have the rake-teeth reach a high position before the pawls are set free, the bolt is removed and the washers put on the head thereof. This will force the bolt to recede, and the head thereof will not strike the hound-frame until the rake-head has rocked farther over front. The tripping device is make controllable by means best shown in Figs. 2, 3, and 11. Upon the part C of the hound-frame is pivoted a pedal G, having an arm G' vertically thereabove, provided in turn with a foot-pad and also with a hook to which the chain $h$ may be connected. When the parts are in the normal position, as shown in Fig. 2, pressure applied to the foot-pad through the instrumentality of the chain will rock the trip-arm so as to cause it to move and cause the pawls to engage the ratchets in the wheels, and at the same time the arm $g'$ will release F from its locking position and cause the rake-head to be rocked in the position shown in Fig. 3 and the load discharged. The foot-pad has an arm $g'$ extending rearwardly, through a hole in the end of which is placed a bolt $g^2$, having therebeneath a number of washers. The pedal is limited in its backward movement by the hound-frame $c$, and the bolt $g^2$, just mentioned, is so placed as to be immediately under the lever that is controlled by the foot-pad $f'$. If it is desired to have the toggle-jointed lever fall to a low position, so that the central pivot $f$ will be far below the locking-point, the washers are taken from the bolt that is placed in the lug $g'$ and placed below the lug. This allows the head of the bolt to fall lower than otherwise. By placing these washers above or below the position to which the part of the lever having the foot-pad $f'$ falls can be regulated.

The movement of the rear pivot of the toggle-jointed connection to the various positions in the slot of the arm D will affect to a limited extent its height at the point beneath the foot-pad $f'$, and this of course will affect somewhat the position of the pivot $f$. Hence the necessity of making the stop $g^2$ adjustable. When the draft of the team is depended upon for rocking the rake-head—that is, when used as a horse-dump rake—if the pivot $f$ is below a line between the pivotal points at its ends which form a lock by the lock $g^2$ being upon the lever G when the latter is moved to pull the chain $h$ and throw the pawls into engagement with the wheels the same movement of the stop $g^2$, striking beneath the extension of the toggle-joint between the foot-pad $f'$, raises the forward end of the toggle-joint sufficiently to bring the pivot $f$ above a line drawn from the pivot at its ends, and the lock is thus broken.

I claim—

1. In a horse-rake, the combination of the hounds, the rake-head pivotally connected thereto, a toggle-joint connection between the hounds and the head, an arm D projecting upwardly from the head, and having a vertical slot through which a pivot-bolt at the rear end of the toggle connection passes, a hinged block connected to the arm D and covering the slot, said block having notches to receive the pivot-bolt and hold it at any position of adjustment in the slot, a releasable lock for holding the block against the arm D, and an adjustable stop at the front end of the toggle connection, whereby the intermediate joint of the toggle may be adjusted to correspond with the adjustment of the pivot-bolt in the arm D.

2. In a horse-rake, the combination of the hounds, the rake-head pivotally connected thereto and suitably supported upon wheels having ratcheted hubs, a tripping device consisting of an arm journaled in bracket-bearings on the head, elastic rock-shafts secured at their inner ends in the hub of said arm and provided at their outer ends with pawls adapted to engage the wheel-hub ratchets, an arm projecting upwardly from the bracket, a spring $I^3$ reacting against the bracket-arm and operating to hold the pawls normally out of engagement with their ratchets, said spring being of insufficient strength to release the pawls after engagement, means for rocking the trip-arm to engage the pawls with the ratchets, and means for positively disengaging the pawls.

3. In a horse-rake, the combination of the hounds, the rake-head pivotally connected thereto, mechanism for automatically dumping the rake, a toggle-joint connection between the hounds and the head, the foremost one of the toggle-levers having a rearwardly-extending handle whereby the rake may be dumped by hand, a pedal-lever mounted on the hounds and having a flexible connection with the rake-head whereby the automatic dumping mechanism may be set in operation, an arm $g'$ extending rearwardly from the pedal-lever under the forward end of the rearmost toggle-lever and an adjustable stop $g^2$ carried by said arm and serving to limit the downward movement of the same, said stop also acting as an adjustable trip for the toggle-lock when the pedal is operated.

JOHN W. LATIMER.

Witnesses:
ARTHUR JOHNSON,
M. W. CRAMER.